(12) United States Patent
Priolo

(10) Patent No.: US 12,135,575 B2
(45) Date of Patent: Nov. 5, 2024

(54) ASYNCHRONOUS FINITE STATE MACHINE OUTPUT MASKING WITH CUSTOMIZABLE TOPOLOGY

(71) Applicant: STMicroelectronics International N.V., Geneva (CH)

(72) Inventor: Roberta Priolo, Milan (IT)

(73) Assignee: STMicroelectronics International N.V., Geneva (CH)

(*) Notice: Subject to any disclaimer, the term of this patent is extended or adjusted under 35 U.S.C. 154(b) by 113 days.

(21) Appl. No.: 17/994,654

(22) Filed: Nov. 28, 2022

(65) Prior Publication Data
US 2024/0176384 A1 May 30, 2024

(51) Int. Cl.
*G06F 1/08* (2006.01)
*G06F 5/08* (2006.01)

(52) U.S. Cl.
CPC . *G06F 1/08* (2013.01); *G06F 5/08* (2013.01)

(58) Field of Classification Search
CPC  G06F 1/08; G06F 5/08; G06F 13/124; H03K 19/003; H03K 19/00323; H03K 19/173; H03K 2005/00013; H03K 2005/00078
USPC ............ 326/9, 12, 46; 327/155, 158; 710/58
See application file for complete search history.

(56) References Cited

U.S. PATENT DOCUMENTS

| | | | |
|---|---|---|---|
| 8,171,330 B2 | 5/2012 | Renaudin et al. | |
| 8,392,858 B2 | 3/2013 | Shi | |
| 10,310,994 B2 | 6/2019 | Stevens et al. | |
| 11,177,805 B1 | 11/2021 | Pant et al. | |
| 2006/0282251 A1* | 12/2006 | Schuppe | G06F 30/33 703/2 |
| 2010/0097131 A1 | 4/2010 | Bainbridge et al. | |
| 2022/0086020 A1* | 3/2022 | Quinn | H04L 7/0012 |
| 2023/0031303 A1* | 2/2023 | Bordes | H03K 19/20 |

OTHER PUBLICATIONS

Ladd, Maureen, et al.: "Synthesis of Multiple-Input Change Asynchronous Finite State Machines," 28th ACM/IEEE Design Automation Conference, 1991, 6 pgs.
Myers, Chris J.: "Asynchronous Circuit Design," 2001, John Wiley & Sons, Inc., 419 pgs.

* cited by examiner

*Primary Examiner* — Ilwoo Park
(74) *Attorney, Agent, or Firm* — Crowe & Dunlevy LLC

(57) ABSTRACT

An AFSM core includes a destination state-cell generating a destination state-signal, and a source state-cell generating a source state-signal and causing transition of the source state-signal in response to an acknowledgement indicating transition of the destination state-signal. The acknowledgment is communicated through a delay. A state-overlap occurs between transition of the destination state-signal and transition of the source state-signal. An output-net includes a balanced logic-tree receiving inputs, including the destination state-signal, from the core, and an additional logic-tree cascaded with the balanced logic-tree to form an unbalanced logic-tree so an input to the additional logic-tree is provided by output from the balanced logic-tree and another input receives the source state-signal. Tree propagation time occurs between receipt of a transition in the destination state-signal by the balanced logic-tree and a resulting transition of the output from the balanced logic-tree. The delay circuit causes the state-overlap to exceed the tree propagation time.

14 Claims, 6 Drawing Sheets

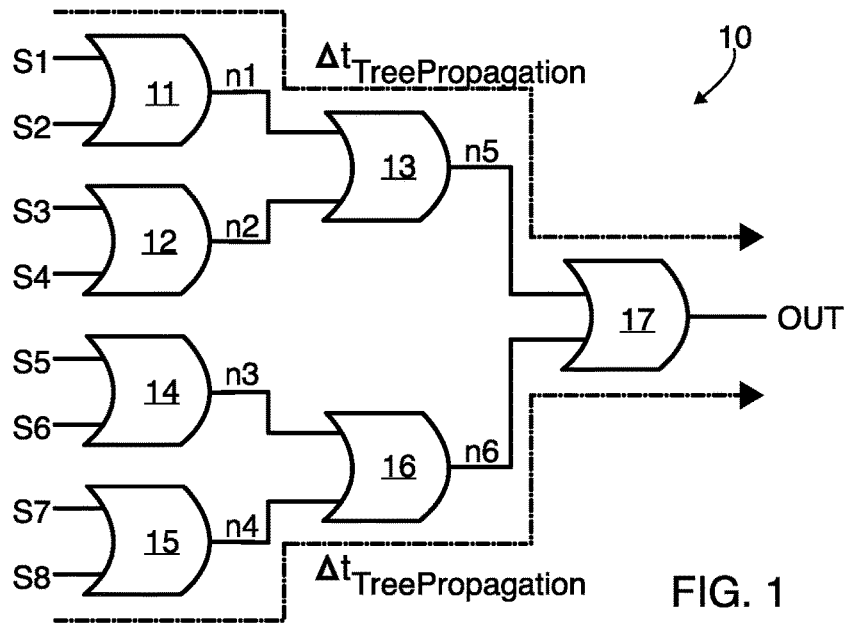
FIG. 1
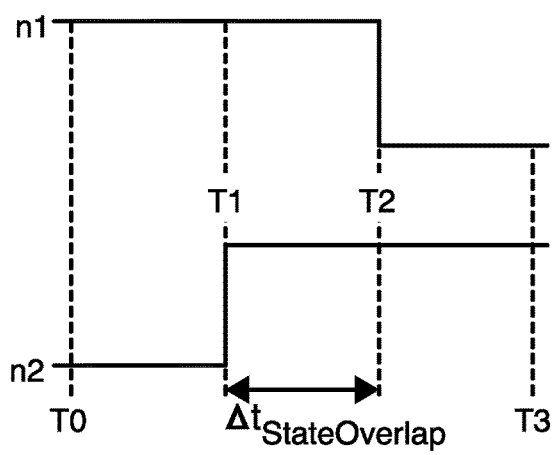
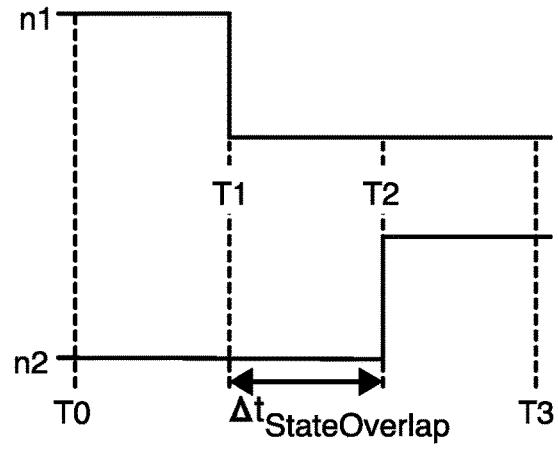
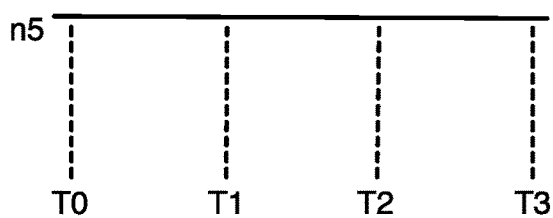
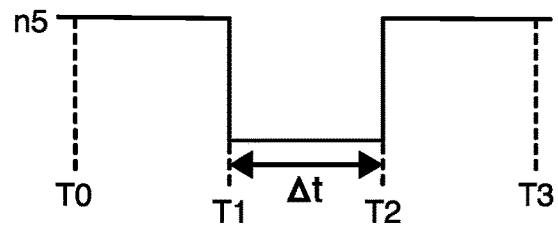
FIG.2A　　　　　　　　FIG.2B

ASYNCHRONOUS FINITE STATE MACHINE OUTPUT MASKING WITH CUSTOMIZABLE TOPOLOGY

TECHNICAL FIELD

This disclosure is directed to the field of combinatorial logic circuits and, in particular, to techniques for detecting hazards introduced into combinatorial logic circuits and the masking of those hazards in order to prevent the occurrence of glitches.

BACKGROUND

Electronic devices typically incorporate semiconductor devices such as integrated circuit chips, systems-on-a-chip, and application-specific integrated circuits (ASICs). These semiconductor devices incorporate logic gates that respond to digital voltage inputs, perform logical operations thereon, and output the result in the form of digital output voltages. A logic gate switches the state of its digital voltage outputs when the logical operation performed on its digital voltage inputs yields a different logic level than the current logic level represented by its current digital output voltage. While this quick asynchronous operation provides for a fast response to changed inputs, it brings with it the possibility of glitches caused by hazards.

Consider now a combinatorial logic circuit, which is a logic circuit that includes multiple logic gates as sub-components, with the outputs of certain of those logic gates being provided as inputs to downstream logic gates. Since logic gates react asynchronously to their inputs, downstream logic gates within a combinatorial logic circuit are susceptible to glitches, which are unwanted downstream output switchings resulting from variances in the timing of the receipt of changes of the outputs of upstream logic gates. These variances are considered to be hazards and may be due to, for example, differences in signal routing paths or layouts.

Consider the combinatorial logic 10 (an OR tree) shown in FIG. 1. The OR tree 10 includes first level OR gates 11, 12, 14, 15, second level OR gates 13, 16, and an output OR gate 17.

Regarding the first level OR gates: OR gate 11 generates an output signal n1 that represents the result of a logical OR operation on the signals S1 and S2 at its input; OR gate 12 generates an output signal n2 that represents the result of a logical OR operation on the signals S3 and S4 at its input; OR gate 14 generates an output signal n3 that represents the result of a logical OR operation on the signals S5 and S6 at its input; and OR gate 15 generates an output signal n4 that represents the result of a logical OR operation on the signals S7 and S8 at its input.

Regarding the second level OR gates: OR gate 13 generates an output signal n5 that represents the result of a logical OR operation on the signals n1 and n2 at its input; and OR gate 16 generates an output signal n6 that represents the result of a logical OR operation on the signals n3 and n4 at its input.

The output OR gate 17 generates the output signal OUT that represents the result of a logical OR operation on the signals n5 and n6.

A tree propagation time $\Delta t_{TreePropagation}$ is the propagation time of a logic change in the inputs S1-S8 through to a resulting logic change in the output signal OUT—for example, if a change in the input S1 from a logic low to a logic high results in the change in the output signal OUT from a logic low to a logic high, the tree propagation time $\Delta t_{TreePropagation}$ is the elapsed time between the receipt of the logic change of the input S1 at the OR gate 11 and the change in logic state of the output signal OUT.

Assuming that the signals S1, S2, S3, and S4 are output by a device such as a state machine, due to variation between OR gates 11 and 12 or due to differences in routing paths/layouts, signals n1 and n2 (as seen by OR gate 13) may not change state simultaneously even if signals S1, S2, S3 and S4 do change state simultaneously.

Consider first the situation shown in the graph of FIG. 2A in which the state change results in both n1 and n2 changing in logic level. At time T0, signal n1 is as seen by OR gate 13 at a logic high while signal n2 as seen by OR gate 13 at a logic low—signal n5 is correspondingly at a logic high. Then, a state change in signals S1, S2, S3, and S4 occurs. By time T1, the state change has propagated such that signal n2 as seen by OR gate 13 rises to a logic high. By time T2, the state change has now propagated such that signal n1 as seen by OR gate 13 rises to a logic high. This lag between the propagation of state changes of signals n1 and n2 as seen by OR gate 13 may be referred to as a state overlap $\Delta t_{StateOverlap}$. In this instance of FIG. 2A, the state overlap is irrelevant because of the logical OR operation performed by OR gate 13—signal n5 does not change logic state during the state overlap.

However, consider now the situation shown in the graph of FIG. 2B. Here, at time T1, the state change has propagated such that signal n1 as seen by OR gate 13 has dropped to a logic low, while the state change has not yet propagated such that signal n2 as seen by OR gate 13 has changed. Therefore, at time T1, signal n5 drops to a logic low since signals n1 and n2 are both at a logic low at time T1. At time T2, the state change has propagated such that signal n2 as seen by OR gate 13 has changed to a logic high; as a result, signal n5 rises to a logic high. As such, observe that during the state overlap between times T1 and T2, signal n5 switched to a logic low.

This extra switching may be referred to as a glitch caused by a functional hazard. This glitch increases power consumption because each pulse demands a rise and fall event, which may also result in additional power wasted downstream from the glitch. Glitches may also inject noise into a design through coupling on signal paths. In addition, glitches may compound as signals traverse the hierarchy of the combinatorial logic circuit.

In order to avoid these negative effects of glitches, such glitches may be masked to avoid improper operational of a downstream device receiving the glitching signal, which leads to additional design complexity. As an alternative to masking glitches, the hazards that allow the occurrence of the glitches may be eliminated. For example, path delay balancing techniques may be applied to the physical design of the combinatorial logic circuit. If path delay balancing techniques were applied to the OR tree 10, the propagation delay of signal n1 to OR gate 13 and signal n2 to OR gate 13 may be equalized. This may be performed through changing of the physical layout of signal routing, the addition of a buffer, or the change in size of one of the OR gates 11 and 12. While these delay balancing techniques are effective, they may result in an increase in the overall propagation delay through the OR tree 10, which may be undesirable when one of the signals S1, S2, S3, and S4 is critical and it is desired to act as quickly as possible in response to a transition of such signal.

Therefore, further development into logic trees is necessary.

SUMMARY

Disclosed herein is an asynchronous finite state machine, including: an input net; and a core receiving inputs provided by the input net. The core includes: a plurality of state cells including at least a source state cell configured to generate a source state signal and a destination state cell linked to the source state cell through an arc circuit, the destination state cell configured to generate a destination state signal; wherein the source state cell is configured to cause a transition in the source state signal in response to a transition in the destination state signal communicated to the source state cell through a feedback path; and wherein a state overlap time is an elapsed time between transition of the destination state signal and transition of the state source signal in response thereto. There is a delay circuit within the feedback path.

An output net receives inputs from the core. The output net includes: a balanced logic tree receiving inputs, including the destination state signal, from the core; and an additional logic tree cascaded with the balanced logic tree to form an unbalanced logic tree such that at least one input to the additional logic tree is provided by output from the balanced logic tree, another input to the additional logic tree receiving the source state signal from the core; wherein a tree propagation time is an elapsed time between receipt of a transition in the destination state signal by the balanced logic tree and a resulting transition of the output from the balanced logic tree provided to the additional logic tree; and wherein the delay circuit inserts a delay to the feedback path that causes the state overlap time to be greater than the tree propagation time.

The delay circuit may be a delay buffer.

The plurality of state cells may include at least a source state cell configured to generate a source state signal and two destination state cells linked to the source state cell through respective arc circuits, the two destination state cells configured to generate first and second destination state signals.

The source state cell may be configured to cause a transition in the source state signal in response to a transition in either of the first and second destination state signals communicated to the source state cell through respective first and second feedback paths.

The state overlap time may be the elapsed time between transition of the first or second destination state signals and transition of the state source signal in response thereto.

The balanced logic tree may receive the first and second destination state signals from the core.

The tree propagation time may be the elapsed time between receipt of a transition in the first or second destination state signals by the balanced logic tree and a resulting transition of the output from the balanced logic tree provided to the additional logic tree.

The delay circuit may be within the first feedback path to cause the state overlap time to be greater than the tree overlap time for receipt of the transition in the first destination state signal by the balanced logic tree and the resulting transition of the output from the balanced logic tree provided to the additional logic tree.

The tree overlap time for receipt of the transition in the second destination state signal by the balanced logic tree and the resulting transition of the output from the balanced logic tree provided to the additional logic tree may be less than the state overlap time between transition of the second destination state signal and transition of the state source signal.

The delay circuit within the first feedback path may be a delay buffer. The second feedback path may lack a delay circuit therein.

An OR gate may be configured to perform a logical OR operation on outputs of the first and second feedback paths. The source state cell may cause the transition in the source state signal in response to assertion of output of the OR gate.

The balanced logic tree may be an OR tree.

The additional logic tree may be an OR gate.

Also disclosed herein is an asynchronous finite state machine, including a core having: a destination state cell that generates a destination state signal; and a source state cell that generates a source state signal, wherein the source state cell is configured to cause transition of the source state signal in response to an acknowledgement signal indicating transition of the destination state signal; wherein the acknowledgment signal is communicated to the source state cell through a delay circuit; and wherein a state overlap time is an elapsed time between transition of the destination state signal and transition of the state source signal in response to the acknowledgement signal indicating the transition of the destination state signal.

An output net receives inputs from the core. The output net includes: a balanced logic tree receiving inputs, including the destination state signal, from the core; and an additional logic tree cascaded with the balanced logic tree to form an unbalanced logic tree such that at least one input to the additional logic tree is provided by output from the balanced logic tree, another input to the additional logic tree receiving the source state signal from the core.

A tree propagation time may be an elapsed time between receipt of a transition in the destination state signal by the balanced logic tree and a resulting transition of the output from the balanced logic tree provided to the additional logic tree.

The delay circuit may cause the state overlap time to exceed the tree propagation time.

The destination state cell may be a first destination state cell and the destination state signal may be a first destination state signal.

A second destination state cell may generate a second destination state signal.

The source state cell may cause transition of the source state signal in response to an acknowledgment signal indicating transition of the first destination state signal or the second destination state signal.

A second state overlap time may be an elapsed time between transition of the second destination state signal and transition of the state source signal in response to the acknowledgement signal indicating the transition of the second destination state signal.

The balanced logic tree may also receive the second destination state signal as input from the core.

A second tree propagation time may be an elapsed time between receipt of a transition in the second destination state signal by the balanced logic tree and a resulting transition of the output from the balanced logic tree provided to the additional logic tree.

The second state overlap time may exceed the second tree propagation time without introduction of delay.

A logical OR gate may receive, as input, the first and second destination state signals and generate the acknowledgement signal as output.

The balanced logic tree may be an OR tree.

The additional logic tree may be an OR gate.

BRIEF DESCRIPTION OF THE DRAWINGS

FIG. 1 is a block diagram of an OR tree.

FIG. 2A is a timing diagram showing the effect of state overlap on signals n1 and n2 within the OR tree of FIG. 1 in a first instance in which the state overlap does not yield a glitch.

FIG. 2B is a timing diagram showing the effect of state overlap on signals n1 and n2 within the OR tree of FIG. 1 in a second instance in which the state overlap yields a glitch.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 3:
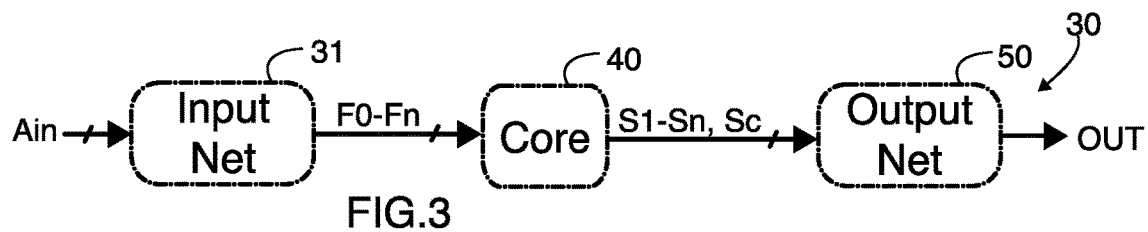
FIG. 3 is a block diagram of an asynchronous finite state machine (AFSM) disclosed herein.

Now described with initial reference to FIG. 3 is an asynchronous finite state machine (AFSM) 30 formed by an input net 31 (e.g., a combinatorial logic circuit) that receives analog inputs and, based on performing an elaboration on those analog inputs, generates input signals F0, ..., Fn. The input signals F0, ..., Fn are received by a core circuit 40 which in turn generates state signals S1, ..., Sn passed to an output net 50. The output net 50 (e.g., a combinatorial logic circuit) in turn generates one or more output signals OUT from the state signals S1, ..., Sn.

Recall the above discussion regarding the OR tree 10 of FIG. 1. This OR tree 10 is usable within the output net 50 of the AFSM 30. In addition, recall from the above discussion of the OR tree 10 how the paths in the OR tree 10 can be balanced to provide for hazard elimination. Assume that the OR tree 10 has balanced paths. Now, consider that one of the state signals S1, ..., Sn may be a critical input or a "critical state" (herein labelled as Sc), meaning that the output of that state signal is to be asserted more quickly than the outputs of the other state signals for an external reason. Thus, it is desired for the output net 50 to receive the critical state signal Sc directly and with a minimum of propagation delay.

Figure 4:
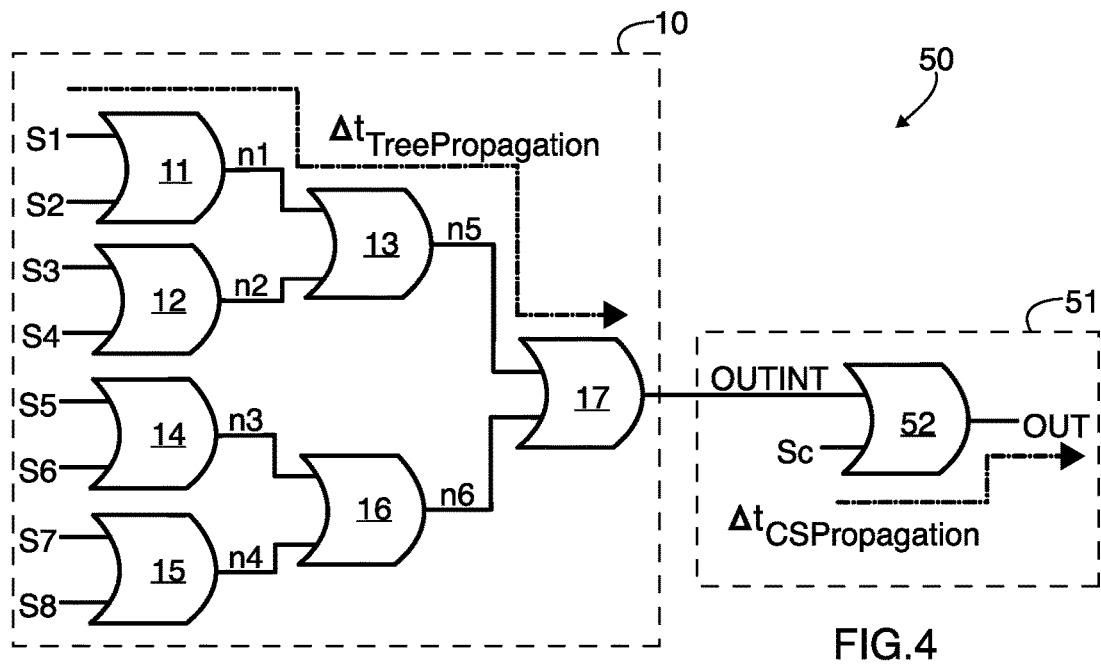
FIG. 4 is a block diagram of a first output net such as may be used in the AFSM of FIG. 3.

Shown in FIG. 4 is an embodiment of the output net 50 of this disclosure that addresses this concern. The output net 50 includes a logic tree 10 (e.g., the balanced OR tree 10 of FIG. 1) cascaded with an OR tree 51 to form an unbalanced logic tree. Here, in the OR tree 10, the output of OR gate 17 is labeled as intermediate output signal OUTINT. In the OR tree 51, an OR gate 52 receives the intermediate output signal OUTINT and the critical state signal Sc as input and generates the output signal OUT based upon a logical OR operation performed thereon. The physical routing carrying the critical state signal Sc from the source of the critical state signal Sc within the core 40 to the OR gate 52 is such that propagation delay between the source of the critical state signal Sc within the core 40 and the OR gate 52 is less than the tree propagation time $\Delta t_{TreePropagation}$. As an example, the physical routing between the source of the critical state signal Sc within the core 40 and the input of the OR gate 52 may be shorter than the physical routing between the state signals S1-S8 and the output of the OR gate 17. In addition, since the critical state signal Sc is provided directly from its source within the core 40 to the input of the OR gate 51, its propagation time is fixed, while the tree propagation time $\Delta t_{TreePropagation}$ is proportional to the number of inputs S1-S8 having their states changed.

Figure 5:
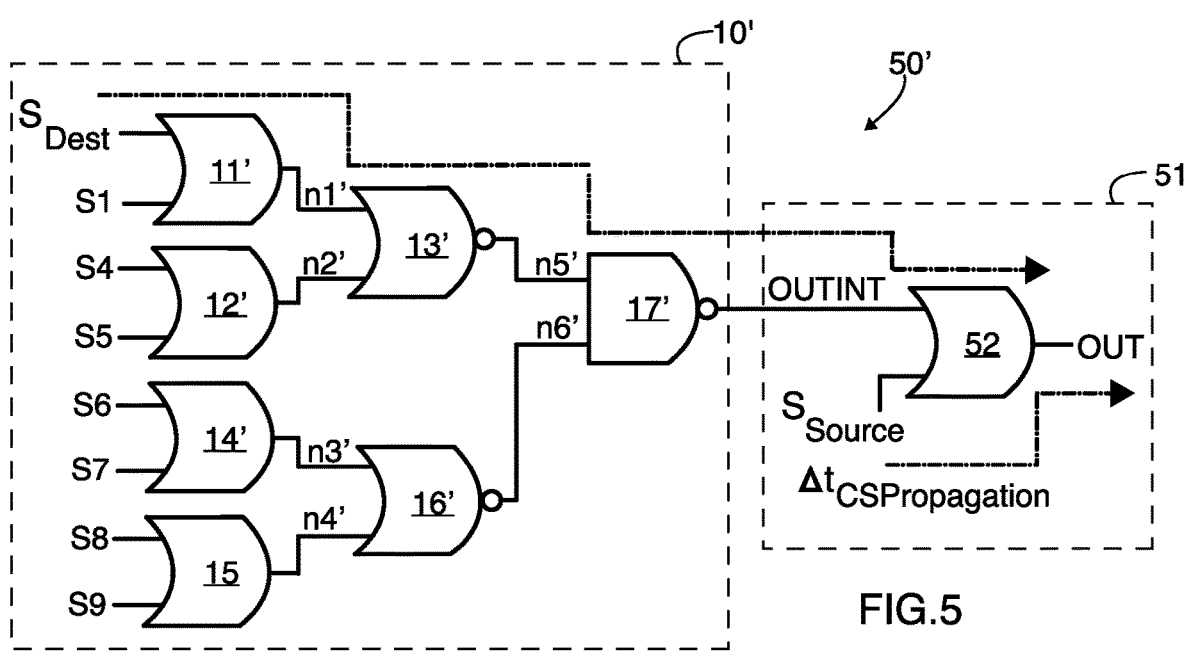
FIG. 5 is a block diagram of a first output net such as may be used in the AFSM of FIG. 3.

Another embodiment of the output net 50' is shown in FIG. 5. Here, the output net 50' includes a balanced logic tree 10' similar to that of FIG. 1, cascaded with the OR tree 51 to form an unbalanced logic tree. Of note in the balanced logic tree 10' here is that the signal S2 is instead labeled as a destination state signal $S_{Dest}$, the logic gates 13' and 16' are NOR gates instead of OR gates, and the logic gate 17' is a NAND gate instead of an OR gate. In addition here, the OR gate 12' receives state signals S4 and S5 at its input, the OR gate 14' receives state signals S6 and S7 at its input, and the OR gate 15' receives state signals S8 and S9 at its input.

In addition, in the OR tree 51 in the output net 50', the critical state signal Sc is instead labeled as $S_{Source}$.

As can be appreciated, the addition of the OR tree 51 may introduce hazards into the output net 50 or 50'. To address this, as will be explained in detail below, the hazards may be detected and in response a delay may be introduced in the internal feedback path within the core 40. The purpose for this delay is to ultimately cause the state overlap $\Delta t_{StateOverlap}$ between OUTINT and Sc or $S_{Source}$ to be greater than the tree propagation time $\Delta t_{TreePropagation}$ which, as will be explained, serves to mask the hazards and, in turn, prevent glitches in the output signal OUT.

The two hazards that may occur in the output net 50 or 50' are a static hazard and a functional hazard. Static hazards are not of concern, as will be explained, but functional hazards are of concern.

A static hazard takes place when a change in an input to a logic component causes the output of the logic component to change momentarily before stabilizing into its correct value. This occurs when a single input is utilized in multiple paths through a combinatorial logic circuit. However, in the OR tree 10 or logic tree 10', a single input is not repeated and therefore static hazards do not occur. Thus, static hazards need not be considered in the design of the AFSM 30.

Functional hazards result from two inputs changing at nearly the same time and are of concern in combinatorial logic. In fact, the hazard described above with reference to FIG. 2B is a functional hazard. Functional hazards can be addressed through the use of a balanced logic tree or by managing the state overlapping time $\Delta t_{StateOverlap}$.

In the balanced logic tree 10, 10' portion of the output net 50, 50' state overlap is not present due to the balanced nature. However, when considering the cascade of the balanced logic tree 10, 10' and the OR tree 51, state overlap is to be taken into account. Here, state overlapping time $\Delta t_{StateOverlap}$ is present between a destination state signal (one of the inputs to the balanced OR tree 10, here being S1-S8; in the case of the balanced logic tree 10', being $S_{Dest}$) and a source state signal (the input to the OR tree 51 received directly from the core 40 that is considered a critical state, here being Sc or $S_{Source}$, the source state and destination state being generated by immediately adjacent state cells within the core 40). This state overlapping time $\Delta t_{StateOverlap}$ can be defined as the interval of time from the transition of the destination state signal $S_{Dest}$ to the transition of the source state signal $S_{Source}$. Contributors to the state overlap $\Delta t_{StateOverlap}$ are the state change time for the relevant state cells within the core circuit 40, and the point at the layout of the output net 50 in which the destination state signals are inserted.

The tree propagation time $\Delta t_{TreePropagation}$ can be defined as the duration of time that the destination state signal $S_{Dest}$ takes to reach the gate where the source state signal $S_{Source}$ is located. In reference to the output net 50, the tree propagation time $\Delta t_{TreePropagation}$ can therefore be defined as the time for one of the inputs S1-S8 to the balanced OR tree 10 to reach the OR gate 52 where the critical state signal Sc is located, or for example in the output 50' can be defined as the time for $S_{Dest}$ to reach OR gate 52. Contributors to the tree propagation time $\Delta t_{TreePropagation}$ include the number of gates between the insertion point of the source state signal $S_{Source}$ and the destination state signal $S_{Dest}$ and the physical layout of the output net 50, 50' itself.

Functional hazards in the output net 50, 50' can occur where the overall output tree (e.g., the OR tree 10 cascaded with the OR tree 51 in the context of the design of FIG. 4, logic tree 10' cascaded with the OR tree 51) is imbalanced and is long, both of which are present in the design of the output net 50, 50'. In addition, functional hazards in the output net 50, 50' can occur when the state overlapping time $\Delta t_{StateOverlap}$ is short. Furthermore, functional hazards can occur when the position of the source $S_{Source}$ and destination $S_{Dest}$ state signals in the output tree are unfavorable, with the source state being placed close to the output signal OUT and the destination state being far from the output signal OUT. Stated differently, functional hazards may occur in the output net 50, 50' when the tree propagation time $\Delta t_{TreePropagation}$ is greater than the state overlapping time $\Delta t_{StateOverlap}$.

Figure 6:
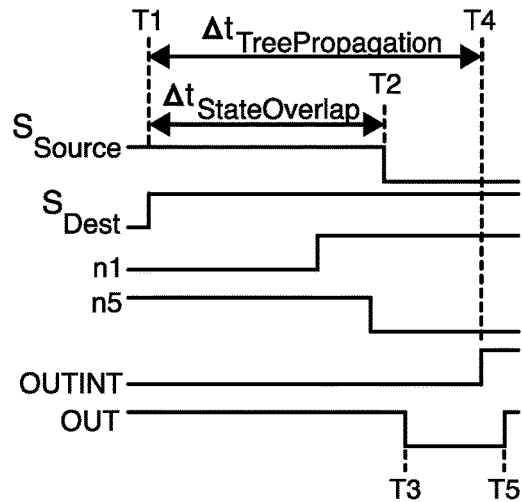
FIG. 6 is a timing diagram showing the relationship between tree propagation delay and state overlap in the state source signals and state definition signals, and its effect on producing glitches, in the operation of the AFSM of FIG. 3 if a prior art core were used.

Example functional hazards will now be described in detail with reference to the output net 50' of FIG. 5. Refer additionally to FIG. 6. At time T1, the destination state signal $S_{Dest}$ transitions to a logic high, yet the source state signal $S_{Source}$ does not transition to a logic low until time T2—therefore, the state overlapping time $\Delta t_{StateOverlap}$ is the interval between times T1 and T2. Yet, the transition of OUTINT to a logic high as a result of $S_{Dest}$ transitioning does not occur until time T4—therefore, the tree propagation time $t_{TreePropagation}$ is the interval between times T1 and T4. As a result of this, the output signal OUT falls to a logic low at time T3 because the source state signal $S_{Source}$ falls to a logic low at time T2. This occurs because the transition of OUTINT to a logic high resulting from the transition of the destination state signal $S_{Dest}$ that occurred at time T1 has not yet propagated to the OR gate 52—as stated, this does not occur until time T4. The output signal OUT finally transitions back to a logic high at time T5 because at time T4, the transition of the destination state signal $S_{Dest}$ that occurred at time T1 has now propagated to the OR gate 52. This transition of the output signal OUT to a logic low at time T3 and back to a logic high at time T5 which, if tree propagation time were not present, would not occur, is a glitch caused by the hazard of the state overlapping time $\Delta t_{StateOverlap}$ (elapsed time between times T1 and T2) being less than the tree propagation time $\Delta t_{TreePropagation}$ (elapsed time between times T1 and T4).

It follows then that to address the potential functional hazards when using the above output net 50' (or any output net that utilized an unbalanced logic tree), the state overlapping time $\Delta t_{StateOverlap}$ between the destination state and source state is to be increased so as to be greater than the tree propagation time $\Delta t_{TreePropagation}$. However, it is not desired to delay every state transition, because that would delay state transitions for state pairs (a destination state and an associated source state being a pair) for which state overlap is not a concern, leading to slower performance. In general, the state overlapping time $\Delta t_{StateOverlap}$ between a desired destination state signal and source state signal may be increased by modifying the core 40 itself via the insertion of an appropriate number of buffers in the feedback branch between the destination state cell and source state cell, which will be described below.

Figure 7:
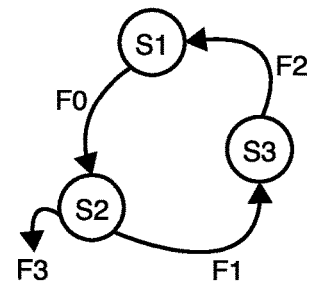
FIG. 7 a sample state diagram.

The core 40 and principles behind the core will now be explained with reference to FIGS. 7-9. Consider the state diagram of FIG. 7, including three state cells S1, S2, and S3. When a state cell is "set" it can be considered to be at a logic one and when a state cell is "reset" it can be considered to be at a logic zero. The initial state in the state diagram of FIG. 7 is such that S1 is set while the other states are reset, since but one state may be set at a time. If input conditions change such that state S2 is to be set (corresponding to the signal F0 being asserted), the transition between S1 and S2 occurs, with the result being that state S2 is set and an acknowledgement is sent back to state S1 to reset state S1. If input conditions change such that state S3 is to be set (corresponding to the signal F1 being asserted), the transition between S2 and S3 occurs, with the result being that state S3 is set and an acknowledgement is sent back to state S2 to reset state S2. If input conditions change such that state S1 is to be set again (corresponding to the signal F2 being asserted), the transition between S3 and S1 occurs, with the result being that state S1 is set and an acknowledgement is sent back to state S3 to reset state S3.

The physical structure of the core 40 is now described with reference to FIGS. 8-9, and thereafter operation will be described. As shown in FIG. 8, the core 40 includes n state cells, with the first state cell 101(1), second state cell 101(2), and third state cell 101(3) being shown, and n arc cells, with the first arc cell 102(1), second arc cell 102(2), and third arc cell 102(3) being shown.

The state cells 101(1), . . . , 101(n) may be thought of a SR latches or Mueller C elements in terms of function. As to inputs, the state cells 101(1), . . . , 101(n) each have: a request input RI, which operates as the "set" input of a SR latch; an acknowledgement input AO, which operates as the "reset" input of a SR latch; and a core reset input (used to reset the core 40 itself, and not to be confused with AO). The state cells 101(1), . . . , 101(n) also have a request output RO, which operates as the output of a SR latch.

Figure 9:
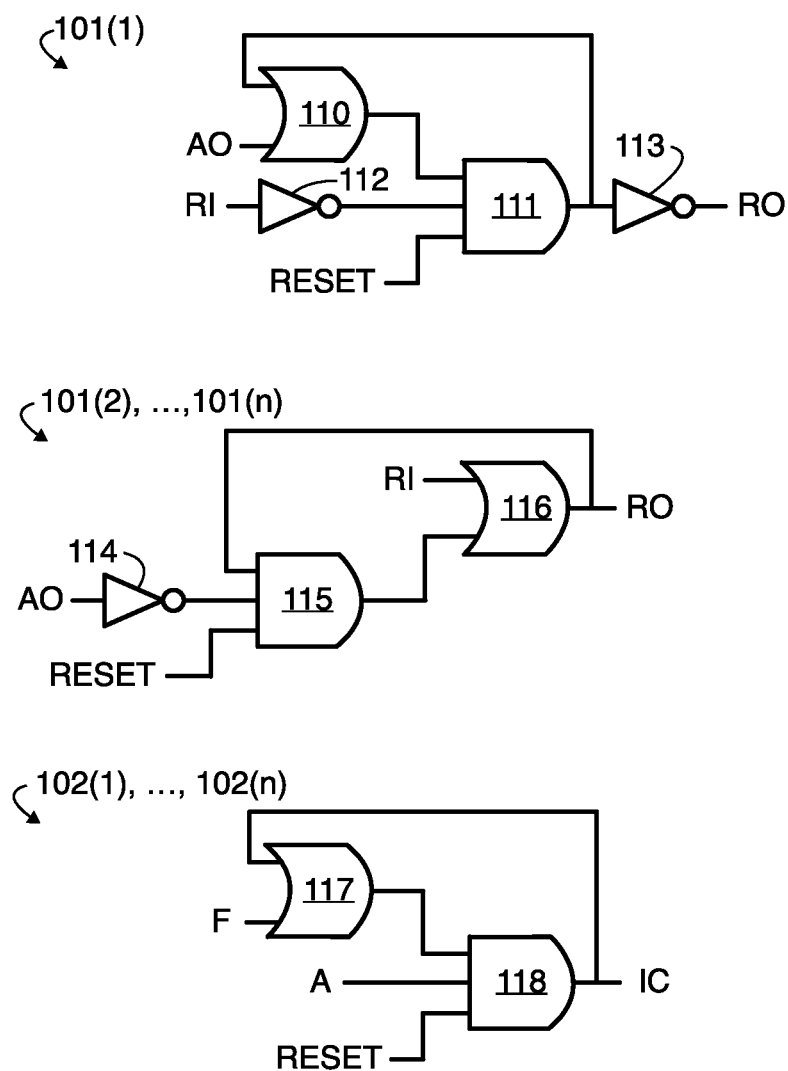
FIG. 9 contains block diagrams showing the structure of the first state cell, subsequent state cells, and ARC cells of the core of FIG. 8.

The specific structure of the state cell 101(1), which is the initial state cell in the logic core 40, is shown in FIG. 9. The state cell 101(1) is formed by an OR gate 110, AND gate 111, and inverter 112. The OR gate 110 has a first input receiving output from the AND gate 111, a second input forming the AO input, and an output provided to a first input of the AND gate 111. An inverter 112 has its input forming the RI input and provides its output to a second input of the AND gate 111. The AND gate 111 has a third input at which a core reset signal RESET is received. The output of the AND gate, after passage through an inverter 113, forms the output RO of the state cell 101(1).

The structure of the remaining state cells 101(2), ..., 101(n) is shown in FIG. 9. The state cells 101(2), ..., 101(n) are formed by an inverter 114, an AND gate 115, and an OR gate 116. The input to the inverter 114 forms the AO input. The AND gate 115 has a first input receiving the RO output as feedback, a second input receiving the output of the inverter 114, and a third input at which the core reset signal RESET is received. The OR gate 116 has a first input forming the RI input, a second input receiving output from the AND gate 115, and its output forms the RO output.

The ARC cells 102(1), ..., 102(n) each have: a function input F receiving a signal indicative of whether the ARC condition is true, an input condition IC output generating an output signal to be provided to the next state cell, and an arc activation A input which acts as an enable input.

The specific structure of the ARC cells 102(1), ..., 102(n) is shown in FIG. 9. The ARC cells 102(1), ..., 102(n) are formed by an OR gate 117 and an AND gate 118. The OR gate 117 has a first input receiving output of the AND gate 118 and a second input forming the F input, and provides output to the first input of the AND gate 118. The AND gate 118 has a second input forming the A input and a third input at which the core reset signal RESET is received. The output of the AND gate 118 forms the IC output.

Figure 8:
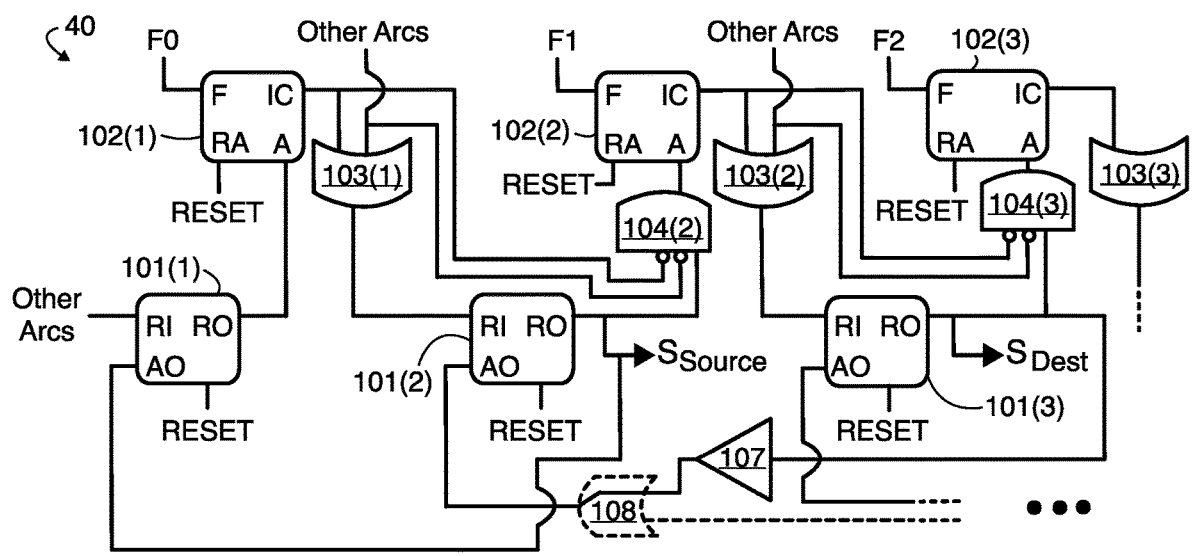
FIG. 8 is a block diagram showing a potential design for the core of the AFSM of FIG. 3.

Returning to the core 40 as shown in FIG. 8, the first state cell 101(1) has its request input RI receiving input from the OR gate output from the other ARC cells that point to the initial state, its acknowledgement input AO coupled to receive the source state signal $S_{Source}$ as output by the second state cell 101(2), and its request output coupled to the arc activation input A of the first ARC cell 102(1). The first ARC cell 102(1) also has its function input F receiving input from the input net 31 and its input condition IC output coupled to OR gate 103(1) as well as to a first inverting input of AND gate 104(2). The OR gate 103(1) also receives input from other ARC cells (if any) that lead from other states to this specific destination state, and provides its output to the request input RI of the second state cell 101(2). The input from the other ARCs is also provided to a second inverting input of AND gate 104(2).

The second state cell 101(2) also has its acknowledgement input AO coupled to receive output from delay cell 107 or optional OR gate 108 and its request output RO coupled to the non-inverting input of AND gate 104(2). Note that here, the second state cell 101(2) is the source state cell, and therefore the source state signal $S_{Source}$ is generated at the request output RO of the second state cell 101(2).

The output of the AND gate 104(2) is provided to the arc activation input A of the second ARC cell 102(2). The second ARC cell 102(2) also has its function input F receiving input from the input net 31 and its input condition IC output coupled to OR gate 103(2) as well as to a first inverting input of AND gate 104(3). The OR gate 104(3) also receives input from other ARC cells, and provides its output to the request input RI of the third state cell 101(3). The input from the other ARCs is also provided to a second inverting input of AND gate 104(3).

The third state cell 101(3) also has its acknowledgement input AO coupled to receive output from the request output RO of the next state cell (not shown) and its request output RO coupled to the non-inverting input of AND gate 104(3). Note that here, the third state cell 101(3) is the destination state cell, and therefore the destination state signal $S_{Dest}$ is generated at the request output RO of the third state cell 101(3). The destination state signal $S_{Dest}$ is passed through the delay buffer 107 (which may be a series of delay buffers) to the Acknowledgement input AO of the second state cell 101(2), or is passed through the delay buffer 107 then provided as input to the optional OR gate 108, with the other inputs to the optional OR gate 108 being provided directly from the request outputs RO of remaining state cells 101(n) (this excludes state cells 101(1) and 101(2)). The signal $S_{Dest}$ is also passed to the non-inverting input of AND gate 104(3).

The output of the AND gate 104(3) is provided to the arc activation input A of the third ARC cell 102(3). The third ARC cell 102(3) also has its function input F receiving input from the input net 31 and its input condition IC output coupled to an OR gate 103(3) associated with the next state cell (not shown) as well as to an AND gate (not shown) associated with the next ARC cell (not shown).

Those of ordinary skill in the art will appreciate that the structure and layout of the state cells 101(2), 101(3) and ARC cells 102(2), 102(3) are replicated to produce a core 40 of any length n having n state cells and n ARC cells, with n being a non-zero integer.

Operation of the core 40 is now described for an instance where the optional OR gate 108 is not present and instead the output of the delay buffer 17 is directly provided to the acknowledgement input AO of the second state cell 101(2). Consider first the reset state in which the core reset signal RESET is asserted to a logic zero and the F0, ..., Fn signals are deasserted by the input net 31 to logic zeroes. In the ARC cells 102(1), ..., 102(n), assertion of the core reset signal RESET to a logic zero results in the input conditions IC each being output as a logic zero. This is so because, as can be observed in FIG. 9 in the ARC cells 102(1), ..., 102(n), the core reset signal RESET being at a logic zero at the input to the AND gates 118 yields an output of a logic zero at the output of the AND gate 119 that provides the input condition IC. As a result of the input conditions IC being output as a logic zero, the OR gates 103(2), ..., 103(n) output logic zeroes and therefore the request inputs RI of the state cells 101(2), ..., 101(n) are received as logic zeroes.

Also, when the core reset signal RESET is asserted to a logic zero, the first state cell 101(1) asserts its request output RO to a logic one while the other state cells 101(2), ..., 101(n) deassert their request outputs RO to logic zeroes. The first state cell 101(1) asserts its request output RO at this point because as can be observed in the block diagram of state cell 101(1) in FIG. 9, a logic zero at the input of AND gate 111 yields an output of a logic one at the output of the inverter 113 that provides the request output RO of the first state cell 101(1). The state cells 101(2), ..., 101(n) deassert their request outputs RO to logic zeroes at this point, because can be observed in the block diagram of state cells 101(2), ..., 101(n) in FIG. 9, logic zeros at the inputs of AND gates 115 yield outputs of logic zeros to OR gates 116. Since the request inputs RI of the state cells 101(2), ..., 101(n) will be at logic zeroes and are provided to the OR gates 116, the OR gates 116 will output logic zeroes as the request outputs RO of the state cells 101(2), ..., 101(n). As a result of the request output RO of the state cell 101(2)

being at a logic zero, the acknowledgement input AO of the state cell 101(1) is at a logic zero, and as a result of the request outputs RO of the state cells 101(3), . . . , 101(n) being at logic zeroes, the acknowledgement inputs AO of the state cells 101(2), . . . , 101(n) are at logic zeroes. As another result of the request outputs RO of the state cells 101(2), . . . , 101(n) being at logic zeroes, the outputs of the AND gates 104(2), . . . , 104(n) provided to the arc activation inputs of the ARC cells 102(2), . . . , 102(n) are at logic zeroes.

Therefore, in summation, in the reset state: the function inputs F of the ARC cells 102(1), . . . , 102(n) receive logic zeroes; the input condition IC outputs of the ARC cells 102(1), . . . , 102(n) are at logic zeroes; the arc activation input of the ARC cell 102(1) receives a logic one; the arc activation inputs A of the ARC cells 102(2), . . . , 102(n) receives logic zeroes; the request inputs RI of the state cells 101(1), . . . , 101(n) receive logic zeroes; the request output RO of state cell 101(1) is at a logic one; the request outputs RO of state cells 101(2), . . . , 101(n) are at logic zeroes; and the acknowledgement inputs AO of the state cells 101(1), . . . , 101(n) receive logic zeroes.

This reset state is represented as state S1 in FIG. 7, and in the reset state (keeping in mind the discussion above about state overlap time $\Delta t_{StateOverlap}$ and tree propagation time $\Delta t_{TreePropagation}$), the source state signal $S_{Source}$ (RO of state cell 101(2)) and the destination state signal $S_{Dest}$ (RO of state cell 101(3)) are at a logic zero.

Now, a state change from state S1 to state S2 is described. Assume that RESET has been released and deasserted to a logic one and that the input net 31 asserts the F0 signal to a logic one. As a result of the arc activation input A of the ARC cell 102(1) receiving a logic one from the request output RO of the state cell 101(1), the ARC cell 102(1) is activated and therefore the logic one at the function input F of the ARC cell 102(1) is output as the input condition IC from the ARC cell 102(1). The input condition IC output from the ARC cell 102(1) as a logic one to an inverting input of the AND gate 104(2) results in the AND gate 104(2) maintaining its output at a logic zero, maintaining the ARC cell 102(2) as being deactivated at this point. The input condition IC output from the ARC cell 102(1) as a logic one results in the OR gate 103(1) outputting a logic one to the request input RI of the state cell 101(2), in turn resulting in the state cell 101(2) asserting its request output RO to a logic one. Therefore, notice that at this point, the request outputs RO of state cell 101(1) and state cell 101(2) are both at a logic one—this is a state overlap.

The request output RO of the state cell 101(2) being output as a logic one to the acknowledgement input AO of the state cell 101(1) resets the state cell 101(1) such that its request output RO is deasserted to a logic zero, ending the state overlap. Therefore here, the state overlap between the request outputs RO of state cells 101(2) and 101(1) is a function of the propagation delay of the request output RO of a logic one from the state cell 101(2) to the acknowledgement input AO of the state cell 101(1) and the propagation delay of the change in state through the state cell 101(1) such that the request output RO of the state cell 101(1) falls to a logic zero. However, the length of the state overlap time between S1 (RO of state cell 101(1)) and $S_{Source}$ (RO of state cell 101(2)) is not a concern and is therefore not taken into account in this design.

The request output RO of the state cell 101(1) as a logic zero is passed to the arc activation input of the ARC cell 102(1) to deactivate the ARC cell 102(1), so that the input condition IC output by the ARC cell 102(1) is deasserted to a logic zero. The logic one output as the request output RO from the state cell 101(2) is now permitted to pass through the AND gate 104(2) because the inverting inputs to the AND gate 104(2) are now at a logic zero. This completes the switch to a new static condition in which the source state signal $S_{Source}$ (RO of state cell 101(2)) is output as a logic one while the destination state signal $S_{Dest}$ (RO of state cell 101(3)) remains being output as a logic zero. This new static condition is state S2 in FIG. 7.

Notice that in the state transition from state S1 to state S2, delay is not inserted in the feedback/acknowledge path from the request output RO of the state cell 101(2) to the acknowledgement input AO of the state cell 101(1). Keeping that in mind, the state transition from state S2 to state S3 is now described.

The input net 31 asserts the F1 signal to a logic one. As a result of the arc activation input A of the ARC cell 102(2) receiving a logic one from the request output RO of the state cell 101(2) after being passed through the AND gate 104(2), the ARC cell 102(2) is activated and therefore the logic one at the function input F of the ARC cell 102(2) is output as the input condition IC from the ARC cell 102(2). The input condition IC output from the ARC cell 102(2) as a logic one to an inverting input of the AND gate 104(3) results in the AND gate 104(3) maintaining its output at a logic zero, maintaining the ARC cell 102(3) as being deactivated at this point. The input condition IC output from the ARC cell 102(2) as a logic one results in the OR gate 103(2) outputting a logic one to the request input RI of the state cell 101(3), in turn resulting in the state cell 101(3) asserting its request output RO to a logic one. Note that the request output RO of the state cell 101(3) is the state source signal $S_{Dest}$. The logic one from the request output RO of the state cell 101(3) is passed through the delay buffer 107 to the acknowledgement input AO of the state cell 101(2) to reset the state cell 101(2) such that its request output RO is deasserted to a logic zero.

This in turn is passed to the arc activation input of the ARC cell 102(2) to deactivate the ARC cell 102(2), so that the input condition IC output by the ARC cell 102(2) is deasserted to a logic zero. The logic one output as the request output RO from the state cell 101(3) is now permitted to pass through the AND gate 104(3) because the inverting inputs to the AND gate 104(3) are now at a logic zero. This completes the switch to a new static condition in which the source state signal $S_{Source}$ (RO of state cell 101(2)) is output as a logic zero while the destination state signal $S_{Dest}$ (RO of state cell 101(3)) remains is output as a logic one. This new static condition is state S3 in FIG. 7.

Figure 10:
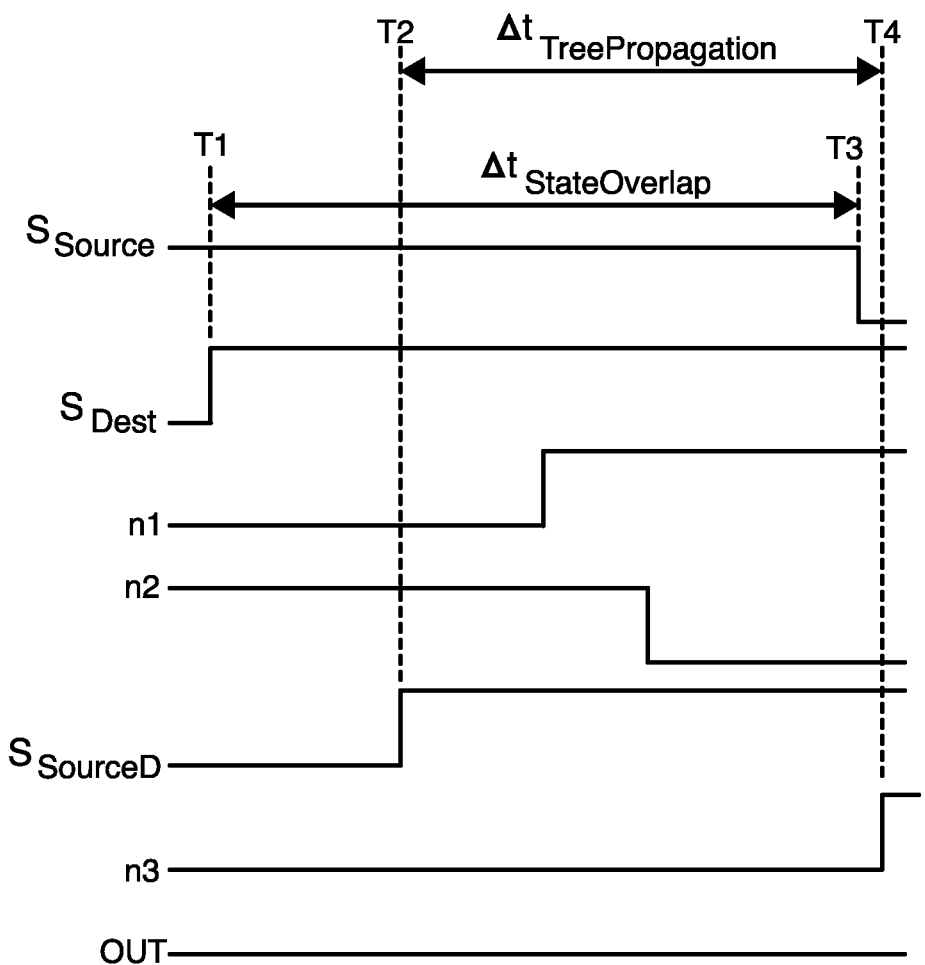
FIG. 10 is a timing diagram showing the relationship between tree propagation delay and state overlap in the state source signals and state definition signals, and its effect on masking glitches caused by hazards, in the operation of the AFSM of FIG. 3 when using the core of FIG. 8.

Recall now the discussion above regarding the output net 50 or 50' and the desire for the state overlap time $\Delta t_{StateOverlap}$ to exceed the tree propagation time $\Delta t_{TreePropagation}$ for critical state transitions between a source state and a destination state. As can be appreciated from the immediately preceding discussion, the logic one (as the destination state signal $S_{Dest}$) from the request output RO of the state cell 101(3) is what resets the state cell 101(2) such that its request output RO (providing the source state signal $S_{Source}$) is deasserted to a logic zero. It follows therefore that the state overlap time $\Delta t_{StateOverlap}$ between the destination state and source state is a function of the propagation delay from the feedback path between the request output RO of the state cell 101(3) and the acknowledgement input AO of the state cell 101(2). Therefore, the delay provided by the delay buffer 107 increases the state overlap time $\Delta t_{StateOverlap}$, and the delay buffer 107 (or multiple such delay buffers) is configured such that the state overlap time $\Delta t_{StateOverlap}$ exceeds the tree propagation time $\Delta t_{TreePropagation}$ by a suitable margin, thereby masking the potential hazard in the output net 50, 50' resulting from the use of the logic tree 51, as can be seen in the timing diagram of FIG. 10. Therefore, where the source state signal $S_{Source}$ is a critical signal, the design of the core 40 in combination with the output net 50 or 50' provides for quick direct propagation of the source state signal $S_{Source}$ to the last logic gate while hazards resulting from that arrangement remain masked.

The above operation was described with reference to the state diagram being that of FIG. 7, where multiple paths to a single state are not present—in other words each state can transition only to one other state. However, if multiple paths to a single state were present (e.g., if multiple destination states could immediately follow a single source state), then the request output RO of each state cell representing a destination state would be fed back as input to the acknowledgement input AO of the state cell representing the source state. In greater detail, the request output RO of the state cell representing the destination state immediately adjacent to the state cell representing the source state is passed through a delay buffer prior to being provided as input to an OR gate having its output connected to the acknowledgement input AO of the state cell representing the source state, with the request outputs RO of the other state cells representing the other destination states that are not immediately adjacent to the state cell representing the source state being fed to the other inputs of the OR gate. This is done so that there cannot be a double state transition from the source state into multiple destination states simultaneously. The state overlap time between the source state and the immediately adjacent destination state is of concern while the state overlap time between the source state and not immediately adjacent destination state is not of concern (since such state overlap time is expected to be sufficient), therefore the delay is only present in the feedback path between the immediately adjacent destination state and the source state (where the state overlap time is not expected to be sufficient).

In the context of the core 40 of FIG. 8, the state cell 101(2) is the source state cell and the state cell 101(3) is a destination state cell that is immediately adjacent to the source state cell. Therefore, the delay buffer 107 is present in the feedback path between the request output RO of the state cell 101(3) and the acknowledgement input AO of the state cell 101(2) to increase the state overlap time therebetween. If there were another destination state cell, that destination state cell would not be immediately adjacent to the state cell 101(2) representing the source state cell, and its request output RO would be directly provided to the input of OR gate 108 (which would be present in this case) while the request output RO of the state cell 101(3) would be passed through the buffer 107 prior to being passed to the input of the OR gate 108. It is the output of the OR gate 108 that would then be provided to the acknowledgement input AO of the state cell 101(2).

Figure 11:
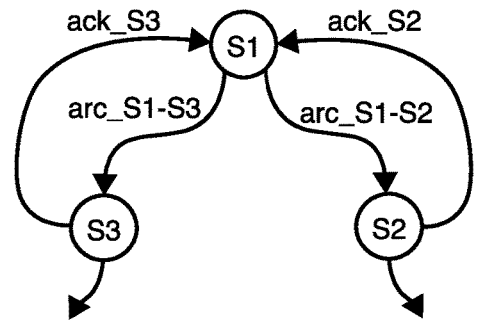
FIG. 11 is another sample state diagram.
Figure 12:
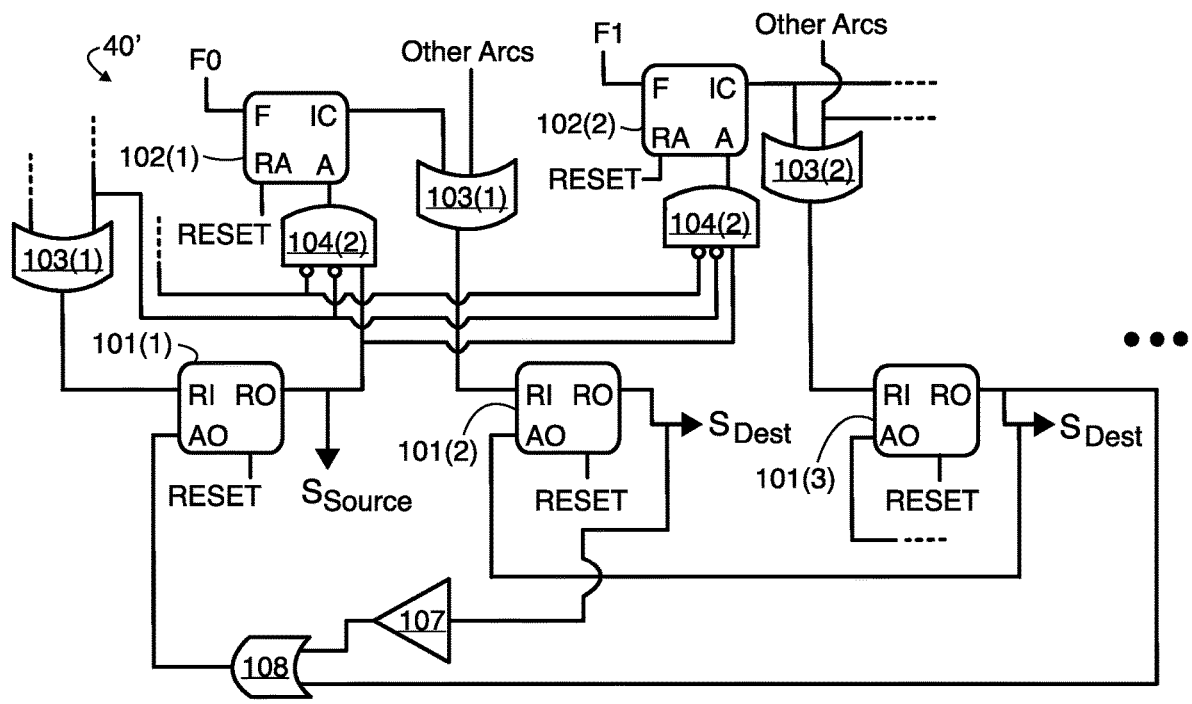
FIG. 12 is another block diagram showing the potential design for the core of the AFSM of FIG. 3.

Such an example is now described in greater detail with additional reference to FIGS. 11-12. In this example, as shown in FIG. 11, either state S2 or S3 may immediately follow state S1, and therefore the acknowledgement is sent from either the state cell for S2 or the state cell for S3 to the state cell for node S1.

Here, state S1 (corresponding to state cell 101(1)) is the critical state, having outputs to be asserted as quickly as possible. In the output net 50', S1 will therefore be placed near the output of the logical tree 51 (e.g., S1 will be input to the OR gate 52 as the source signal $S_{Source}$). Since S2 is placed at the beginning of the logical tree 51 (e.g., S2 will be input to OR gate 11' as the destination signal $S_{Dest}$), the tree propagation time will be greater than the state overlap, and a delay will be inserted in the feedback of this transition as will be described below. If S3 is placed closer to S1 in the output net 50' and the tree propagation time is less than the state overlap, and the feedback of this transition may lack a delay.

The specific core 40' design of shown in FIG. 12. The core 40' includes n state cells, with the first state cell 101(1) representing state S1, second state cell 101(2) representing state S2, and third state cell 101(3) representing state S3. The core 40' also includes n arc cells, with the first arc cell 102(1), second arc cell 102(2), and third arc cell 102(3) being shown.

The first state cell 101(1) has its request input RI receiving input from the output of the OR gate 103(1), which performs a logical OR of the outputs from the other ARC cells that point to the initial state. The first state cell 101(1) has its acknowledgement input AO coupled to receive the output of OR gate 108. OR gate 108 performs a logical OR of the destination states $S_{Dest}$ output at the RO outputs of the second state cell 101(2) and third state cell 101(3), with the destination state $S_{Dest}$ output at the RO output of the second state cell 101(2) being passed through a delay buffer 107 prior to being input to the OR gate.

The request output RO of the first state cell 101(1) outputs the source state signal $S_{Source}$ and is coupled to a non-inverting input of AND gate 104(2). The AND gate 104(2) has inverting inputs coupled to the other ARC cells that point to the initial state, and provides its output to the arc activation input A of the first ARC cell 102(1). The first ARC cell 102(1) also has its function input F receiving input F0 from the input net 31 and its input condition IC output coupled to OR gate 103(1). The OR gate 103(1) also receives input from other ARC cells (if any) that lead from other states to this specific destination state, and provides its output to the request input RI of the second state cell 101(2). The second state cell 101(2) also has its acknowledgement input AO coupled to receive the destination state $S_{Dest}$ for S3 output by the third state cell 101(3), and has its request output RO outputting the destination state signal $S_{Dest}$ for S2, provided to the input of the delay buffer 107.

The inputs to the AND gate 104(2) are the same as for AND gate 104(1), and the output of the AND gate 104(2) is provided to the arc activation input A of the second ARC cell 102(2). The second ARC cell 102(2) also has its function input F receiving input F1 from the input net 31 and its input condition IC output coupled to OR gate 103(2) as well as to other state cells down the line.

The third state cell 101(3) has its acknowledgement input AO coupled to receive output from the request output RO of the next state cell (not shown) and its request output generating the destination signal $S_{Dest}$ for state S3. As stated, this destination state signal $S_{Dest}$ for state S3 is logically OR'd with the delayed destination state signal $S_{Dest}$ for state S2 by OR gate 108, as described above. It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An asynchronous finite state machine, comprising:
an input net;
a core receiving inputs provided by the input net and comprising:
a plurality of state cells including at least a source state cell configured to generate a source state signal and a destination state cell linked to the source state cell through an arc circuit, the destination state cell configured to generate a destination state signal;
wherein the source state cell is configured to cause a transition in the source state signal in response to a transition in the destination state signal communicated to the source state cell through a feedback path;
wherein a state overlap time is an elapsed time between transition of the destination state signal and transition of the source state signal in response thereto; and
a delay circuit within the feedback path; and
an output net receiving inputs from the core, the output net comprising:
a balanced logic tree receiving inputs, including the destination state signal, from the core; and
an additional logic tree cascaded with the balanced logic tree to form an unbalanced logic tree such that at least one input to the additional logic tree is provided by output from the balanced logic tree, another input to the additional logic tree receiving the source state signal from the core;
wherein a tree propagation time is an elapsed time between receipt of a transition in the destination state signal by the balanced logic tree and a resulting transition of the output from the balanced logic tree provided to the additional logic tree; and
wherein the delay circuit inserts a delay to the feedback path that causes the state overlap time to be greater than the tree propagation time.

2. The asynchronous finite state machine of claim 1, wherein the delay circuit comprises a delay buffer.

3. The asynchronous finite state machine of claim 1,
wherein the plurality of state cells include at least a source state cell configured to generate a source state signal and two destination state cells linked to the source state cell through respective arc circuits, the two destination state cells configured to generate first and second destination state signals;
wherein the source state cell is configured to cause a transition in the source state signal in response to a transition in either of the first and second destination state signals communicated to the source state cell through respective first and second feedback paths;
wherein the state overlap time is the elapsed time between transition of the first or second destination state signals and transition of the source state signal in response thereto;
wherein the balanced logic tree receives the first and second destination state signals from the core;
wherein the tree propagation time is the elapsed time between receipt of a transition in the first or second destination state signals by the balanced logic tree and a resulting transition of the output from the balanced logic tree provided to the additional logic tree; and
wherein the delay circuit is within the first feedback path to cause the state overlap time to be greater than the tree overlap time for receipt of the transition in the first destination state signal by the balanced logic tree and the resulting transition of the output from the balanced logic tree provided to the additional logic tree.

4. The asynchronous finite state machine of claim 3, wherein the tree overlap time for receipt of the transition in the second destination state signal by the balanced logic tree and the resulting transition of the output from the balanced logic tree provided to the additional logic tree is less than the state overlap time between transition of the second destination state signal and transition of the source state signal.

5. The asynchronous finite state machine of claim 4, wherein the delay circuit within the first feedback path comprises a delay buffer; and wherein the second feedback path lacks a delay circuit therein.

6. The asynchronous finite state machine of claim 3, further comprising an OR gate configured to perform a logical OR operation on outputs of the first and second feedback paths; and wherein the source state cell causes the transition in the source state signal in response to assertion of output of the OR gate.

7. The asynchronous finite state machine of claim 1, wherein the balanced logic tree comprises an OR tree.

8. The asynchronous finite state machine of claim 1, wherein the additional logic tree comprises an OR gate.

9. An asynchronous finite state machine, comprising:
a core comprising:
a destination state cell that generates a destination state signal; and
a source state cell that generates a source state signal, wherein the source state cell is configured to cause transition of the source state signal in response to an acknowledgement signal indicating transition of the destination state signal;
wherein the acknowledgment signal is communicated to the source state cell through a delay circuit; and
wherein a state overlap time is an elapsed time between transition of the destination signal state and transition of the source state signal in response to the acknowledgement signal indicating the transition of the destination state signal; and
an output net receiving inputs from the core, the output net comprising:
a balanced logic tree receiving inputs, including the destination state signal, from the core; and
an additional logic tree cascaded with the balanced logic tree to form an unbalanced logic tree such that at least one input to the additional logic tree is provided by output from the balanced logic tree, another input to the additional logic tree receiving the source state signal from the core;
wherein a tree propagation time is an elapsed time between receipt of a transition in the destination state signal by the balanced logic tree and a resulting transition of the output from the balanced logic tree provided to the additional logic tree; and
wherein the delay circuit causes the state overlap time to exceed the tree propagation time.

10. The asynchronous finite state machine of claim 9,
wherein the destination state cell is a first destination state cell and the destination state signal is a first destination state signal;
further comprising a second destination state cell that generates a second destination state signal;
wherein the source state cell causes transition of the source state signal in response to an acknowledgment signal indicating transition of the first destination state signal or the second destination state signal;

wherein a second state overlap time is an elapsed time between transition of the second destination state signal and transition of the source state signal in response to the acknowledgement signal indicating the transition of the second destination state signal;

wherein the balanced logic tree also receives the second destination state signal as input from the core; and wherein a second tree propagation time is an elapsed time between receipt of a transition in the second destination state signal by the balanced logic tree and a resulting transition of the output from the balanced logic tree provided to the additional logic tree.

11. The asynchronous finite state machine of claim 10, wherein the second state overlap time exceeds the second tree propagation time without introduction of delay.

12. The asynchronous finite state machine of claim 10, further comprising a logical OR gate receiving, as input, the first and second destination state signals and generating the acknowledgement signal as output.

13. The asynchronous finite state machine of claim 9, wherein the balanced logic tree comprises an OR tree.

14. The asynchronous finite state machine of claim 9, wherein the additional logic tree comprises an OR gate.

* * * * *